US007632529B2

(12) United States Patent
Lang

(10) Patent No.: US 7,632,529 B2
(45) Date of Patent: Dec. 15, 2009

(54) FOOD DEPOSITION APPARATUS AND METHOD OF MANUFACTURING A MULTI-COMPONENT FOOD PRODUCT

(75) Inventor: Robert Lang, Wendouree (AU)

(73) Assignee: Mars, Incorporated, McLean, VA (US)

( * ) Notice: Subject to any disclaimer, the term of this patent is extended or adjusted under 35 U.S.C. 154(b) by 758 days.

(21) Appl. No.: 10/542,166

(22) PCT Filed: Jan. 16, 2004

(86) PCT No.: PCT/AU2004/000058

§ 371 (c)(1),
(2), (4) Date: May 18, 2006

(87) PCT Pub. No.: WO2004/064532

PCT Pub. Date: Aug. 5, 2004

(65) Prior Publication Data

US 2006/0246194 A1  Nov. 2, 2006

(30) Foreign Application Priority Data

Jan. 17, 2003  (AU) .............................. 2003900246

(51) Int. Cl.
A23G 3/12 (2006.01)
A23G 3/34 (2006.01)
(52) U.S. Cl. ........................ 426/249; 222/132; 222/135; 222/144.5; 425/130; 425/256; 425/449; 426/512; 426/660
(58) Field of Classification Search ................. 425/130, 425/256, 447, 449; 426/103, 249, 512, 660; 222/132, 135, 136, 144.5
See application file for complete search history.

(56) References Cited

U.S. PATENT DOCUMENTS

| 524,097 | A | * | 8/1894 | Walier | 425/449 |
| 1,404,548 | A | * | 1/1922 | Salerno | 222/135 |
| 2,031,386 | A | * | 2/1936 | Rapisarda | 425/130 |
| 2,597,175 | A | * | 5/1952 | Perkins | 425/449 |
| 3,468,265 | A | * | 9/1969 | Otken | 425/130 |
| 4,184,613 | A |   | 1/1980 | Kinney | 222/145 |
| 4,500,273 | A | * | 2/1985 | Anderson | 425/449 |

(Continued)

FOREIGN PATENT DOCUMENTS

EP  1103187  5/2001

*Primary Examiner*—Robert B Davis
(74) *Attorney, Agent, or Firm*—Fitzpatrick, Cella, Harper & Scinto

(57) ABSTRACT

Disclosed is apparatus for the storage and deposition of a plurality of liquid food components to a mold, said apparatus including: a deposition mechanism for intermittently depositing predetermined quantities of said plurality of liquid food components to said mold, said mechanism having a plurality of individual deposition points; a plurality of liquid food storage vessels, each having an outlet adapted to supply an individual liquid food component to said deposition mechanism; and a plurality of arrayed liquid food supply galleries extending from said liquid food storage vessels to said deposition mechanism, thereby to facilitate flow of said food components to said deposition points; where in said plurality of liquid food storage vessels are each equipped with an elongate outlet, said outlet being adapted to allow said liquid food to flow substantially directly into each supply gallery along that inlet region; and wherein there is provided a means for selectively allowing or preventing flow of the contents of each or any of said vessels to each or any of said galleries.

9 Claims, 4 Drawing Sheets

U.S. PATENT DOCUMENTS

| | | | |
|---|---|---|---|
| 4,588,599 A | * 5/1986 | Cerboni | 426/660 |
| 4,738,074 A | * 4/1988 | Invernizzi et al. | 53/122 |
| 5,019,404 A | 5/1991 | Meisner | 426/249 |
| 6,383,539 B1 | 5/2002 | Akutagawa | 426/249 |
| 2005/0244545 A1 | * 11/2005 | Akelaitis | 426/103 |

* cited by examiner

FOOD DEPOSITION APPARATUS AND METHOD OF MANUFACTURING A MULTI-COMPONENT FOOD PRODUCT

FIELD OF THE INVENTION

The invention relates to the field of commercial food manufacture. In particular, the invention relates to improved apparatus for depositing multiple liquid food components in to a mould.

BACKGROUND OF THE INVENTION

Increasing consumer sophistication has led to a desire for food manufacturers to provide food products of more striking appearance. A common method of improving the visual appeal of food products, especially in the field of confectionery manufacture, is to provide multi-component food products, for example multi-coloured confectionery pieces. In the following discussion, the term 'multicoloured confectionery' will be understood by persons skilled in the art to encompass confectionery that is made up of individual pieces of a single colour, such as 'jelly beans', and confectionery pieces that contain multiple colours within the same piece, such as the well-known multicoloured 'snake' candy.

Existing techniques for providing multicoloured confectionery pieces will now be discussed, however those skilled in the art will appreciate that the techniques discussed herein may equally be applied to other food product fields.

A typical production line for the production of multicoloured sugar-based confectionery pieces involves deposition of the confectionery material as syrup into starch moulds. Typically, the syrup is drawn from one or more supply hoppers into a deposition apparatus that includes syrup supply galleries extending from the hopper(s), a reciprocating positive displacement pump and valve system and a set of deposition nozzles bored through a nozzle plate. The positive displacement pump and valve system typically employs a multi-piston and cylinder device, but may equally be a rotary pump type.

The syrup is typically drawn into the supply galleries, which extend laterally across the deposition apparatus, by the pistons operating in a priming stroke. Then the syrup is forced by the pistons, in a discharge stroke, out of the supply galleries and downward through one or more of the nozzles in the nozzle plate, thereby depositing the syrup into a predetermined pre-formed mould cavity in the starch mould.

A number of individual dispensing vessels (ie hoppers) are typically positioned alongside and adjacent the inlet side of the deposition apparatus, and are typically configured to provide a single colour to a set group of galleries along each side of the depositor. Where multicoloured deposition is to be performed, a single, multi-compartment hopper vessel may also be used, each compartment then containing different coloured syrups. The multi-compartment hopper includes a storage vessel which extends along the inlet side of the deposition apparatus, and is divided at set intervals along its length by dividing walls that separate the different coloured syrups from one another. Each of the coloured syrups flow from the individual hopper compartments to the group of galleries immediately adjacent the division of the hopper containing that coloured syrup. Therefore, confectionery pieces of a given colour may only be deposited in the zone of the starch mould that is immediately adjacent the hopper compartment (or individual hopper vessel, if employed) that contains syrup of that colour.

The above described system works well for multicoloured products such as jelly beans, where many different coloured pieces are produced, but where individual pieces contain a single colour. However, if it is desired to manufacture pieces of confectionery, where each piece contains more than one colour, such equipment is not suitable as it is not capable of delivering individual colours to different zones throughout the starch mould.

A technique that is well known in the prior art for overcoming this drawback is the insertion of a distribution plate in between the supply galleries and the deposition nozzles. The distribution plate is typically a metal plate that has an intricate pattern of channels milled through it that are designed to direct flow of a particular coloured syrup from the zone in which it is available to the zone where it is required to be deposited.

However, a major drawback of this type of system is that for every different type or shape of product to be made there is required a different distribution plate. Each distribution plate tends to be bulky, intricate in design and difficult to manufacture. These plates are accordingly very expensive in terms of design, manufacturing and storage costs. They also tend to be very heavy and difficult to install and remove, increasing production downtime and presenting a health and safety risk to those operators whose job it is to change them between runs of different products.

In addition, the lengthy flow paths that are required in the distribution plate tend to produce variability in the deposit volume and therefore in the mass of individual pieces. This may cause an aesthetic problem with the confectionery pieces, as well as obliging the manufacturer to increase their product giveaway to account for the potential shortfall in product mass.

SUMMARY OF THE INVENTION

Therefore, it is an object of the present invention to provide an improved deposition apparatus that alleviates the problems of the prior art.

In one aspect of the invention, there is provided an apparatus for the storage and deposition of a plurality of liquid food components to a mould, said apparatus including:

a deposition mechanism for intermittently depositing predetermined quantities of said plurality of liquid food components to said mould, said mechanism having a plurality of individual deposition points;

a plurality of liquid food storage vessels, each having an outlet adapted to supply an individual liquid food component to said deposition mechanism; and a plurality of arrayed liquid food supply galleries extending from said liquid food storage vessels to said deposition mechanism, thereby to facilitate flow of said food components to said deposition points;

wherein said plurality of liquid food storage vessels are each equipped with an elongate outlet, said outlet being adapted to allow said liquid food to flow substantially directly into each supply gallery along that inlet region; and wherein there is provided a means for selectively allowing or preventing flow of the contents of each or any of said vessels to each or any of said galleries.

This configuration allows greater flexibility in the design of varied and irregular deposition patterns than has been possible with prior art equipment, because the invention makes each of the different components accessible to each of the galleries in the deposition apparatus as desired, thereby rendering it a simple matter of opening or closing an access point for any chosen component to be directed to any chosen gallery. A further advantage of this arrangement is that, unlike in the prior art, each component has a relatively short flow path to any position in the deposition apparatus. This has advantages in that variability in deposit volume is significantly reduced, thereby reducing the amount of necessary giveaway in each product.

Advantageously, a program plate with apertures positioned adjacent the chosen component hopper for each desired gallery provides the means by which flow of the desired component is selectively directed to the chosen gallery. It will be appreciated by those skilled in the art that changing the flow pattern of components to individual deposition points may be achieved by simply changing the configuration of the program plate, without need to modify the internal geometry of the deposition mechanism itself, for example by installing a distribution plate.

This provides a significant simplification to existing technologies, whereby separate deposition mechanisms must be provided for each different deposition pattern, and where some of these patterns may be extremely complex and costly to manufacture, in the order of AUD 10,000 per pattern. In contrast, the invention provides a way of altering the deposition pattern by simply replacing a relatively simple and inexpensive change-part, namely the program plate.

The longitudinally oriented storage vessel outlets allow this design to be contemplated, as they allow the different components to be available to all galleries of the deposition apparatus, not merely a select few, as in the prior art. Program plates typically cost less than AUD 1,000 to manufacture, and take much less time to change over between runs.

Preferably, the apparatus is configured such that the space between the vessel outlets and the galleries is adapted to receive program plates that are configured to simply slide into and out of operational position, thereby reducing the complexity and time taken to change the moulding equipment between runs of different products.

Most preferably, the invention is characterised by a plurality of broad, nested hoppers, each having an elongate slot serving as an outlet, said slots being located one on top of the other and running the length of the deposition apparatus; and wherein the program plates are solid plates whose height is substantially equal to the combined height of said slots and which feature apertures aligned vertically with each individual slot and aligned longitudinally with the individual galleries into which it is desired that the liquid food from said slot will flow.

In another aspect, the invention provides multicoloured confectionery when deposited by the above described apparatus.

In yet another aspect of the invention there is provided a method of making multicoloured confectionery, including the step of depositing via deposition apparatus as described above.

Now will be described, by way of a specific non-limiting example, a preferred embodiment of the invention.

DETAILED DESCRIPTION OF A PREFERRED EMBODIMENT

Figure 1:
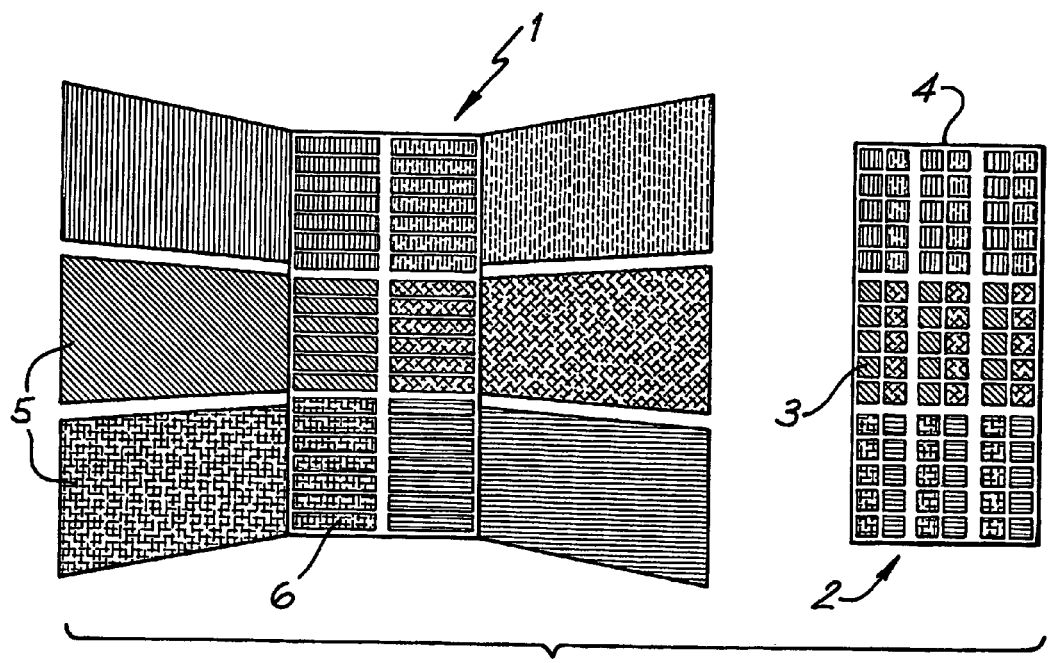
FIG. 1 shows a schematic plan view of a confectionery depositor according to the prior art.

Referring first to FIG. 1, there is shown a schematic plan view of a multi-coloured confectionery depositor 1, of the type well known in the art, and a schematic view 2 of the confectionery pieces 3 deposited in a starch mould by this type of depositor. The position of the depositor galleries 6 are also shown.

Numerous companies manufacture such depositors, including NID of Australia, and Winkler & Dunnebier of Germany. Such depositors are defined by one or more syrup hoppers which are positioned adjacent a deposition mechanism, usually a sliding or rotating valve type but other mechanisms may be used, which is positioned above a starch mould, as described above in discussion of the prior art.

The multi-component syrup hoppers 5, being divided into separate compartments for each of the different coloured syrups, are arranged along each side of the deposition mechanism 1. Represented particularly in FIG. 1 are the positions of the syrup flow galleries 6. It will be noted that only the galleries positioned immediately adjacent the hoppers of particular colours have access to the syrup of that colour. Therefore, if that colour is required to be deposited at another point in the starch tray 4, then a complex drilled nozzle plate of the type well-known in the art will be required to be positioned between the galleries and the deposit nozzles. The nozzle plate will need to have a channel cut into it that is capable of transporting the syrup of the desired colour from the gallery where it is available to the point where it is required. As discussed above, the need for such complicated nozzle plates presents numerous disadvantages.

Figure 2:
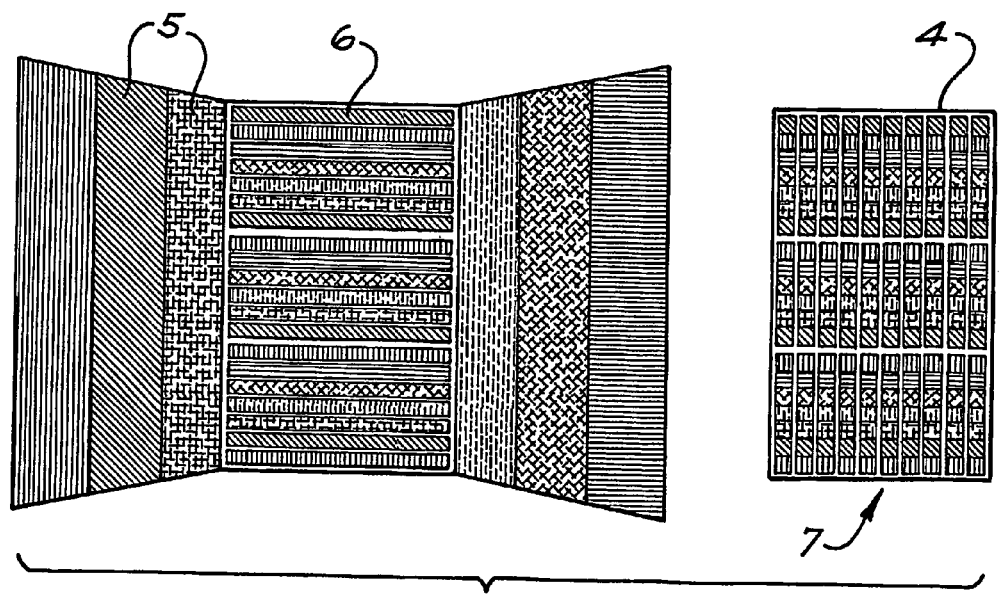
FIG. 2 shows a schematic plan view of a confectionery depositor according to the invention.

Turning now to FIG. 2, there is shown a schematic plan view of a confectionery depositor according to the invention. In particular, the internal divisions of the syrup hoppers 5 will be noted: the dividing walls run longitudinally through the hoppers 5. As illustrated, the coloured syrups are therefore available to any of the galleries in the depositor, as the outlets of the hoppers are now effectively adjacent all of the galleries. This means that by simply opening or closing access of the syrup to a given gallery, each of the coloured syrups is readily available to any part of the deposit mechanism, as reflected in the schematic view of the multicoloured pieces deposited in the starch tray 4.

Figure 3:
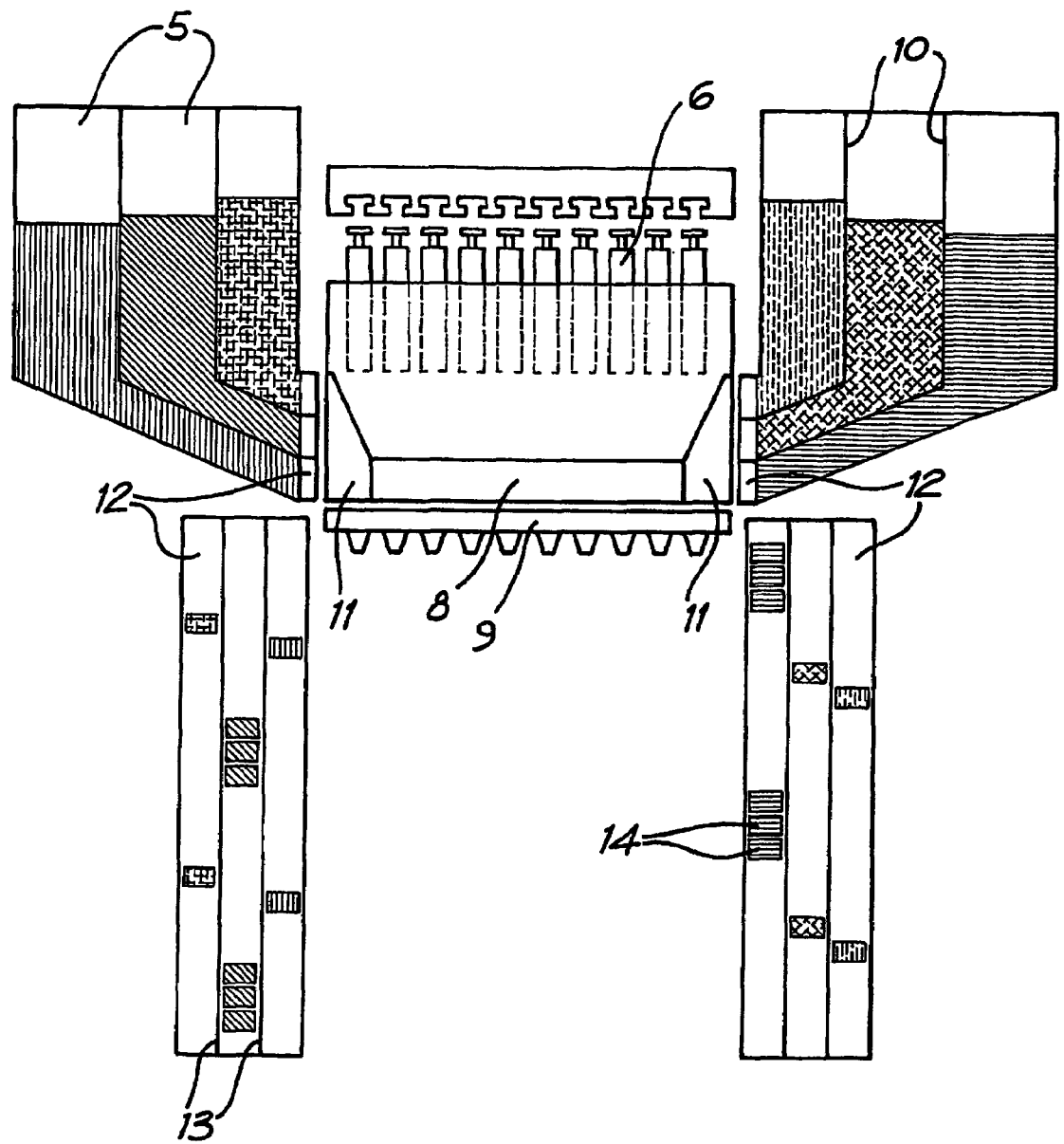
FIG. 3 shows a sectional elevation view of a confectionery depositor according to the invention.

FIG. 3 shows a cross-sectional view of the configuration of the hoppers 5 of a depositor according to the invention. The deposition mechanism is represented schematically by the pistons 8, galleries 6 and nozzle plate 9. It will be seen that the hoppers are divided from one another by plates 10 running longitudinally along the length of the depositor sides. The syrup in each of the hoppers 5 can then flow into a common access point 11 to each individual gallery. A program plate 12 can then be inserted in between the hoppers and the access point. The program plate 12 can be selectively drilled to allow the desired colour syrup into the access point, while blocking access to the other colour syrups. This has the effect of eliminating the distribution plate, or at least greatly simplifying the nature of any channeling required in the distribution plate.

As the program plates themselves, also illustrated in elevation view in FIG. 3, are relatively simple, and as they are positioned in a readily accessible point in the depositor assembly, it is therefore a relatively simple matter to remove and replace the specific program plates for each different product design. The program plate illustrated is divided into three longitudinal divisions 13, corresponding with the longitudinal positions of the outlets of the three hoppers, and numerous lateral sections 14, corresponding with the positions of each of the depositor galleries. In order to select which colour syrup flows into which gallery, it is simply necessary to provide a hole in the program plate at the position where the selected syrup hopper coincides with the selected gallery.

Figure 4:
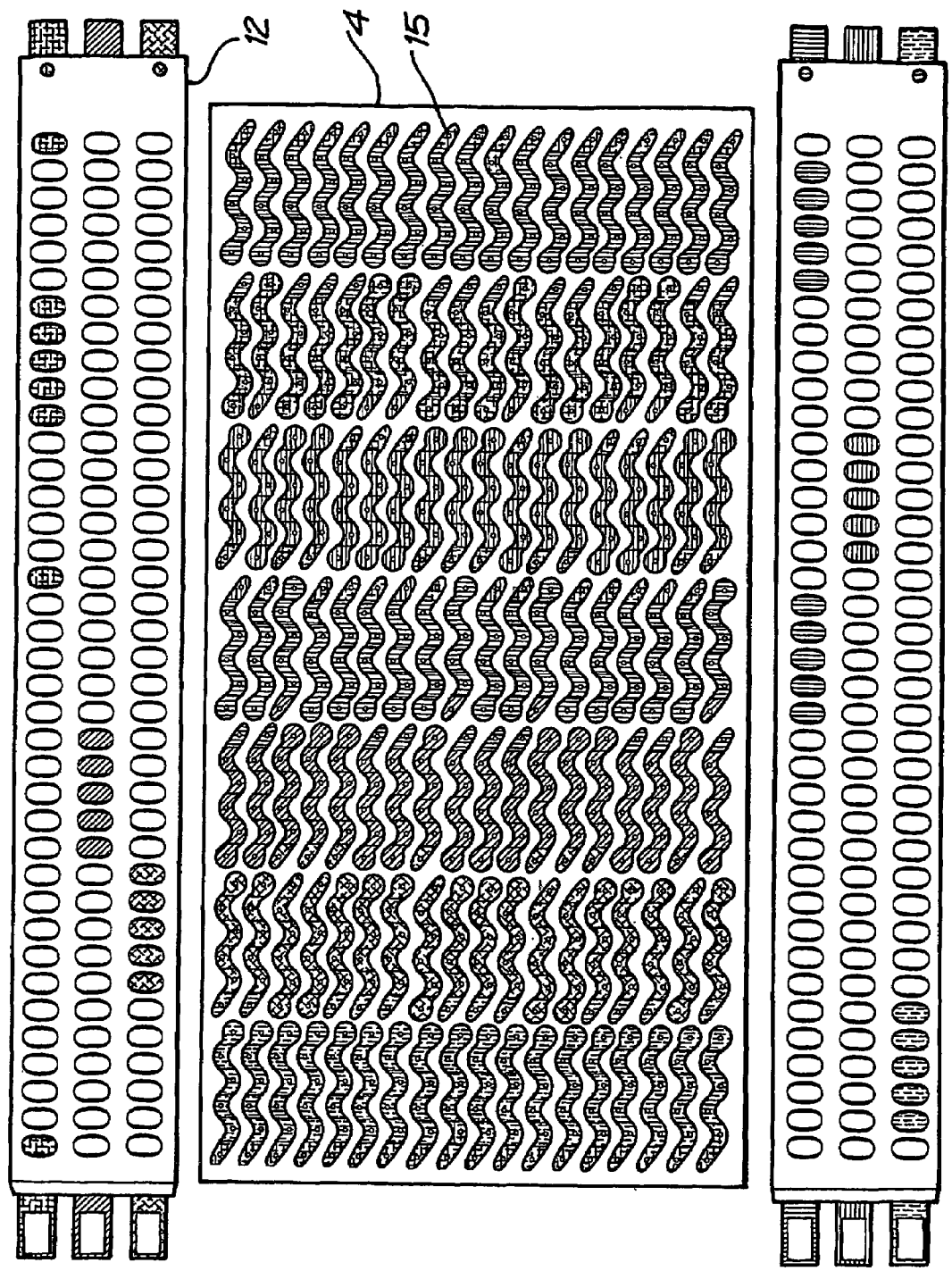
FIG. 4 shows an example of multicoloured 'snake' confectionery design, as deposited in a starch mould, which may be provided by the invention; and the program plates that may be used to achieve this design.
Figure 5:
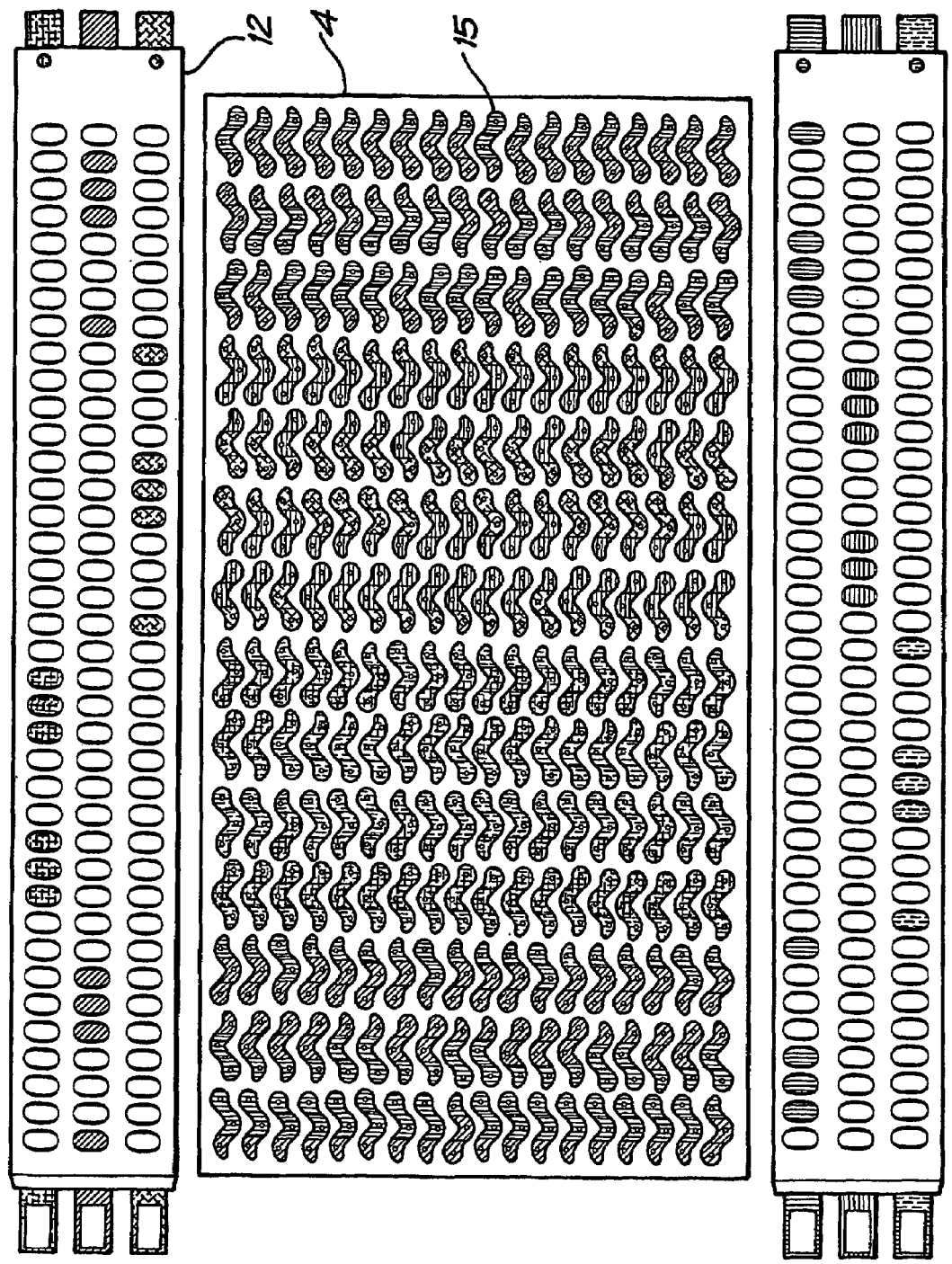
FIG. 5 shows another example of multicoloured 'snake' confectionery design, as deposited in a starch mould, which may be provided by the invention; and the program plates that may be used to achieve this design.

Potential program plate designs for corresponding multicoloured confectionery 'snake' designs 15 are illustrated in FIGS. 4 and 5. In both of these diagrams, the open holes of the program plates are shaded in a manner corresponding with the syrup colour that is intended to flow through the plate at that point.

While the above example is primarily concerned with deposition of different coloured sugar syrups for sugar-based confectionery, the person skilled in the art will appreciate that the principles upon which the invention is based are applicable to the delivery of many other kinds of fluid food materials and to many other kinds of deposition apparatus.

The skilled person will also appreciate that the physical design and arrangement of many of the components of the apparatus depicted may be altered while still remaining within the scope of the invention. For example, the entirety of the hoppers themselves need not be elongated: the hoppers may be positioned individually along the side of the deposition apparatus, much as shown in FIG. 1, provided the hopper outlets themselves are elongate and extend along the array of gallery inlets. However, the longitudinal nature of the hoppers shown in FIG. 3 advantageously provides more even liquid flow across the breadth of the hopper outlet slots.

The claims defining the invention are as follows:

1. Apparatus for the storage and deposition of a plurality of liquid food components to a mould, said apparatus including:
    a deposition mechanism for intermittently depositing predetermined quantities of said plurality of liquid food components to said mould, said mechanism having a plurality of individual deposition points;
    a plurality of liquid food storage vessels, each having an outlet adapted to supply an individual liquid food component to said deposition mechanism; and
    a plurality of arrayed liquid food supply galleries extending from said liquid food storage vessels to said deposition mechanism, thereby to facilitate flow of said food components to said deposition points;
    wherein said plurality of liquid food storage vessels are each equipped with an elongate outlet, said outlet being adapted to allow said liquid food to flow substantially directly into each supply gallery along that inlet region; and
    wherein there is provided a means for selectively allowing or preventing flow of the contents of each or any of said vessels to each or any of said galleries.

2. The apparatus of claim 1, wherein the means by which flow of the liquid food from any one vessel is directed to the predetermined gallery or galleries is a program plate, said program plate having apertures selectively positioned such that, when said plate is installed in an operational position between said vessel outlet and the inlet of said chosen galleries, said apertures provide an open conduit between both the given liquid food vessel outlet and the inlet of each predetermined gallery, thereby allowing only the given liquid food to enter said predetermined gallery or galleries.

3. The apparatus of claim 2, wherein a plurality of interchangeable customised program plates are provided for the direction of food component flow required for different individual product deposition schemes.

4. The apparatus of claim 2, wherein the apparatus is configured such that a space between the outlets of said vessels and the inlets of said galleries is adapted to receive program plates that are adapted to slide into said operational position, thereby facilitating interchange of the depositing configuration of the moulding equipment between runs of different products.

5. The apparatus of claim 1, wherein said liquid food storage vessels are characterised by a plurality of broad, nested hoppers, each having an elongate slot serving as an outlet, said slots being effectively arranged one on top of the other and disposed adjacent the inlets of the arrayed galleries.

6. The apparatus of claim 5, wherein the program plates are solid plates whose height is substantially equal to the combined height of said slots and which feature apertures aligned vertically with each individual slot and aligned longitudinally with the individual galleries into which it is desired that the liquid food from said slot will flow.

7. A method of manufacturing a multi-component food product, said method including the step of depositing one or more of said components using the apparatus as defined in claim 1.

8. The method of claim 7, wherein said one or more components are coloured confectionery syrups.

9. The method of claim 7, wherein said multi-component food product is multi-coloured confectionery.

* * * * *